Feb. 7, 1956   C. F. LINDEE, JR   2,733,737
LATHE HEADSTOCK
Filed Nov. 10, 1953   2 Sheets-Sheet 2
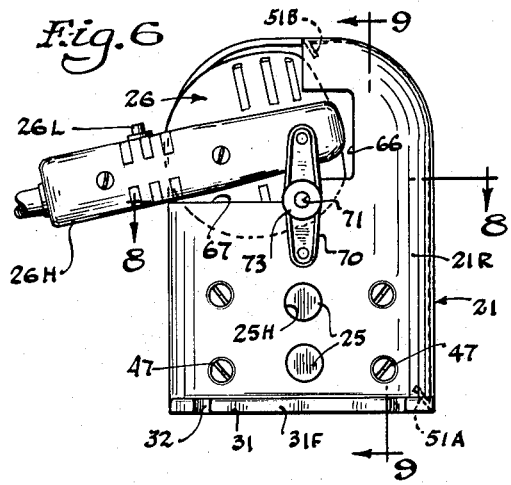
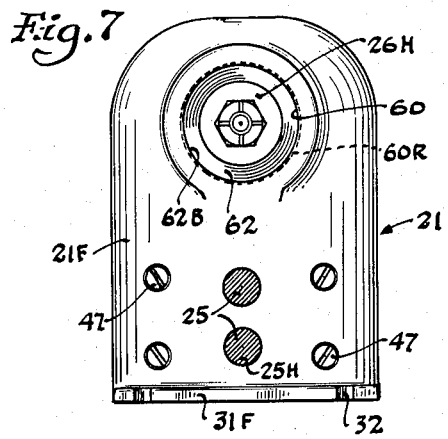
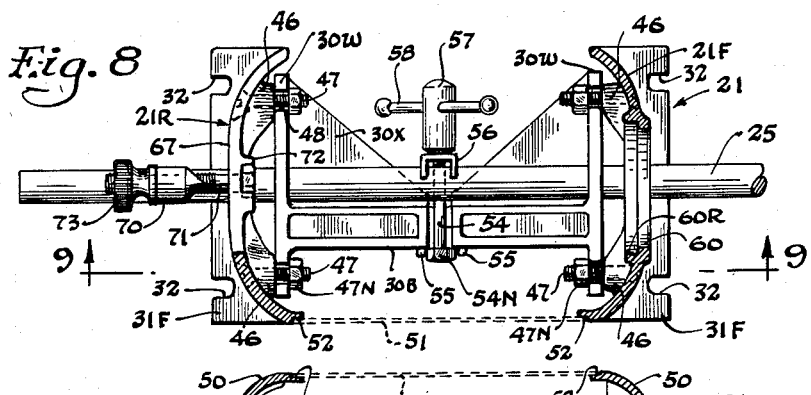
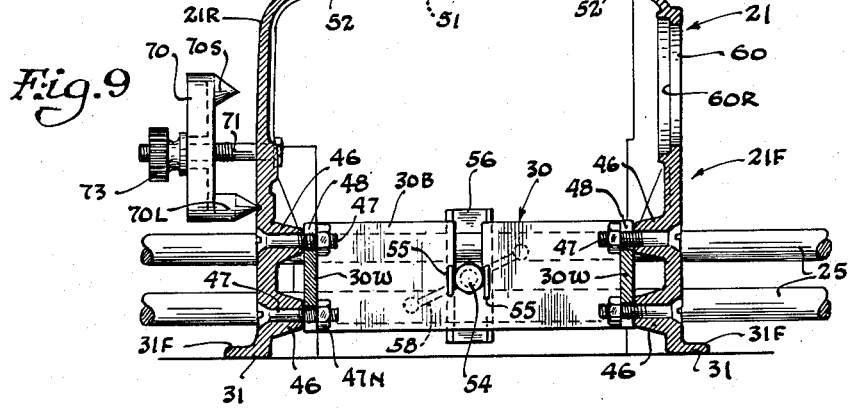
Inventor
Carl F. Lindee, Jr.
By Fred Ring
Attorney

United States Patent Office 2,733,737
Patented Feb. 7, 1956

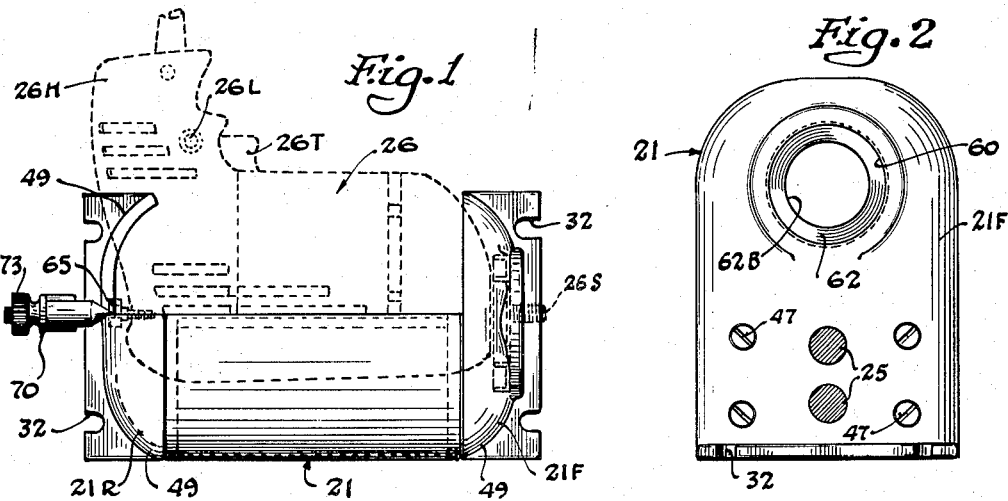
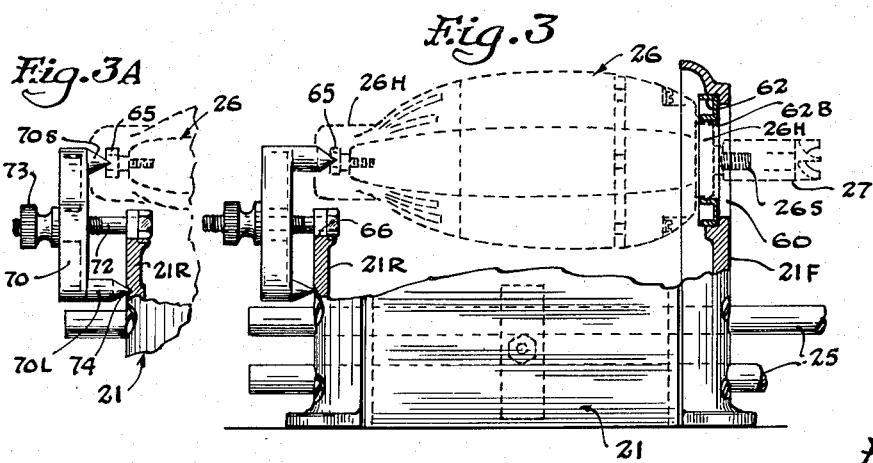
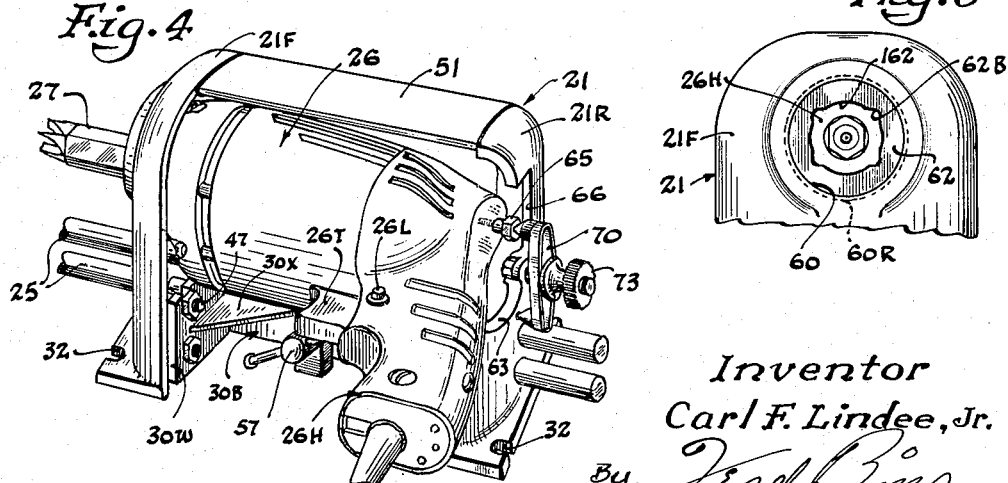

2,733,737
LATHE HEADSTOCK

Carl F. Lindee, Jr., Chicago, Ill., assignor to Portable Electric Tools, Inc., Chicago, Ill., a corporation of Illinois Application November 10, 1953, Serial No. 391,268

12 Claims. (Cl. 142—1)

This invention relates to multiple purpose machine tools, and particularly to headstock structures therefor.

In those instances where a portable electric drill is to be utilized as the power source and headstock spindle in a multiple purpose machine tool, means must be afforded for supporting and mounting the portable electric drill in an accurately determined relationship in such headstock. It is well known that portable electric drills are made in a wide variety of shapes and sizes, but the primary variation that is found among such portable electric drills is in the longitudinal dimension, and hence in order to provide for such mounting of portable electric drills of different sizes, it has heretofore been necessary to afford headstock structures of different dimensions for each size of drill.

In view of the foregoing, it is an important object of the present invention to enable headstock structures of the aforesaid character to be readily and easily manufactured for the mounting of portable electric drills of different sizes, and an object related to the foregoing is to enable such headstock structures to be manufactured with the desired degree of accuracy at a relatively low cost.

As hereinabove pointed out, the portable electric drills that are found on the market vary in several respects, and one other important point of variation is in the size and shape of the projecting bearing hub through which the power output shaft of the drill extends. This projecting hub affords a convenient means for locating the drill in the desired accurate position with respect to the headstock, but the fact that variations are encountered in the size and shape of the bearing hub has heretofore rendered the provision of headstock structures relatively expensive where it was desired to have such headstock structures adaptable for different drills. It is therefore a further object of the present invention to afford a simple and effective means for accurately centering and locating the output shaft of a portable electric drill as it is mounted in a headstock, and a related object is to enable this to be accomplished by engagement of a separately formed locating ring with the projecting bearing hub of the drill, thereby to render it possible to afford different locating rings for the mounting of differently shaped drills in a common headstock structure.

When the problem of mounting a portable electric drill and headstock is considered, it is noted that in prior headstock structures, no provision has been made for the mounting of saw-grip type drills, and another object of the present invention is to afford a clamping and positioning structure in such headstocks that is capable of cooperating with and accurately positioning portable electric drills of either the pistol-grip or saw-grip type. Other and related objects of the present invention are to afford such a clamping means which has at least two different clamping positions whereby in the same headstock, drills of a somewhat different length may be readily and easily mounted.

Other and further objects of the present invention will be apparent from the following description and claims and are illustrated in the accompanying drawings which, by way of illustration, show a preferred embodiment of the present invention and the principle thereof and what I now consider to be the best mode in which I have contemplated applying that principle. Other embodiments of the invention embodying the same or equivalent principle may be used and structural changes may be made as desired by those skilled in the art without departing from the present invention and the purview of the appended claims.

In the drawings:

Fig. 1 is a plan view of a headstock embodying the features of the invention.

Fig. 2 is a front end elevational view of the headstock;

Fig. 3 is a front elevational view, taken partially in central vertical section;

Fig. 3A is a view showing the clamping means in a different position so as to clamp a drill of a different length;

Fig. 4 is a rear perspective view of the headstock;

Fig. 5 is a front end elevational view showing a different form of locating ring.

Fig. 6 is a rear end elevational view of the headstock;

Fig. 7 is a front elevational view of the headstock;

Fig. 8 is a horizontal cross sectional view of the headstock; and

Fig. 9 is a vertical sectional view taken substantially along the lines 9—9 of Figs. 6 and 8.

For purposes of disclosure, this invention is herein illustrated as embodied in a headstock 21 that is adapted through the use of tie rods or bars 25 to be associated with the other machine elements, such as a tailstock, of a multiple purpose machine in the manner disclosed in my copending application Serial No. 391,336, filed November 10, 1953, and the headstock 21 under the present invention is adapted to removably receive and position a power source that is afforded by a conventional portable electrically operated drill 26 that is so located on and with respect to the headstock 21 that the conventional screw-threaded output shaft 26S of the drill 26 constitutes the headstock spindle of the tool. This headstock spindle 26S that is thus afforded is arranged so that it may receive a driving spur center or headstock center 27 which is, in the assembled relation of the tool 20, properly aligned for cooperation with the other elements of the complete tool.

In the basic structure afforded under the present invention, the headstock 21 is formed from a pair of end plates or castings 21F and 21R that are held in a spaced relationship by an internal spacing bracket 30 that is secured to the inside faces of the end castings 21F and 21R. The end castings 21F and 21R have bottom surfaces 31 formed thereon and defined by mounting flanges 31F, and these mounting surfaces 31 are disposed in a plane that is parallel to the axis of the headstock spindle, and such surfaces 31 are adapted to rest upon a mounting surface 23 such as a bench. The headstock 21 may be secured to the mounting bench by fastening means not shown, passed downwardly through slots 32 formed in the edges of the flanges 31F, as shown in Figs. 1 and 8 of the drawings.

The bracket 30, which serves to join the end castings 21R and 21F in the desired endwise spacing and in rigid relationship, is made in the form of a casting to afford a relatively heavy longitudinal bar 30B and transverse vertically positioned end walls 30W that are braced with respect to the bar portion 30B by means of triangular webs 30X. End castings 21R and 21F are adapted to be secured to the opposite end webs 30W of the spacing bracket 30, and for this purpose, the end castings have projecting pads 46 on their inner faces that are adapted to bear against the opposed flat surfaces of the end webs 30W. Four such pads 46 are provided in the present instance on each end casting, and bolts 47 are extended through the pads so that they may extend somewhat loosely through locating notches 48 that are formed in the upper and lower edges of the end webs 30W. Nuts 47N are threaded onto the bolts 47 and after establishing the desired accurate relation between the end castings and the bracket 30, the nuts 30N are tightened so as to clamp the end webs 30W against the pads 46 and thus secure the end castings 21R and 21F in the rigid and accurately established relationship with respect to the spacing bracket 30. It will be noted that the spacing or tie rods 25 extend through openings 25H in the end castings 21F and 21R, and similar openings are provided in the end webs 30W of the spacing bracket 30, and to facilitate accurate alignment and location of the parts, the openings in the webs 30W are accurately formed to accurately close tolerance, while the openings 25H in the end castings 21F and 21R are formed with sufficient clearance to permit the parts to be readily and easily assembled in the desired relationship.

The castings 21R and 21F have bottom flanges 31F as hereinbefore described, and these castings have vertically extended walls that are curved at their front and rear edges, as indicated at 49, so as to add strength to these castings, and this is particularly important since the connecting bracket 30 is associated with the end castings 21F and 21R relatively close to the lower edge portions of these castings. At their upper edges, the end castings are also curved as at 50, Fig. 9, and this results in a pleasing appearance in the exposed surfaces of such castings.

Between the end castings 21R and 21F a forward wall portion of the headstock 21 is afforded through the provision of a relatively thin sheet metal cover plate 51 that extends between the end castings and is located with its vertical edge portions in outwardly facing rabbeted grooves 52 that are formed along the upwardly and rearwardly extending edges of the forward sides of the end castings. At the lower edges of these castings, the edge of the cover sheet 51 is bent inwardly and upwardly as at 51A, Fig. 6, about the lower ends of the flanges that afford the rabbeted grooves 52, while the upper edge of the cover plate 51 is bent downwardly into a locking relationship as at 51B, it being noted that the flanges that form the rabbeted grooves 52 terminate at this upper point to afford end edges about which bending of the cover plate 51 may be accomplished.

The spacing bars 25 are adjustably clamped to the connecting bracket 30 of the headstock 21, and this is accomplished by extending a clamping bolt 54 horizontally and in a rearward direction through the bar portion 30B so that this bolt will pass between the bars 25 in an equally spaced relation thereto. At its forward end, the head 54H of the bolt 54 is disposed between a pair of ribs 55, as shown in Figs. 8 and 9, so as to hold the bolt against rotation, and at its threaded rear end, a clamping bar 56 of U-shaped cross section is placed over the bolt so that complemental upper and lower side edge portions of the clamping bar 56 will embracingly engage the rear faces of the two bars 25. A clamping nut 57 threaded onto the rear end of the bolt 54 may be rotated by means of a cross bar 58 to clamp the bar 56 against the two rods 25 and at the same time to clamp the rods 25 against the positioning surfaces afforded by the opening in the end webs 30W through which the rods 25 extend, and this serves to adjustably position the headstock 21 with respect to the bars 25.

In effect, the engagement of the headstock with the tie rods 25 is a three-point connection in each case. That is, the surfaces defining the holes in the webs 30W engage, in the case of each tie rod, the two longitudinally spaced points thereon whereas the clamping bar 56 engages the tie rods substantially midway between the aforementioned two longitudinally spaced points and the clamping bar serves to force the tie rods into engagement with the surfaces defining the openings in the webs 30W through which the tie rods pass. Since the openings 25H in the end plates 21R and 21F are larger than the openings in the webs 30W, as previously stated, the surfaces defining the latter openings are those against which the tie rods are urged by the action of the clamping bar 56. Of course, this specific relationship is not critical inasmuch as it is necessary only that some means be provided for affixing the headstock 21 at a desired longitudinal position on the tie rods for performing the work desired.

Means are afforded on the headstock 21 for locating an electric drill 26 accurately in such a position that the output shaft of the drill constitutes a headstock spindle, and in accomplishing this, means are afforded on opposite ends of the headstock for engaging the drill and positioning the same with respect to the headstock. In respect to the end casting 21F, such locating means are afforded by providing a circular opening 60 that has an annular rabbeted groove 60R defined about its inside surface, and this opening 60 and the groove 60R are made substantially larger than the largest bearing hub 26H, Fig. 7, that would normally be encountered in conventional electric drills. These bearing hubs 26H take different forms in drills manufactured by different manufacturers, and as described in detail hereinafter, means are afforded for enabling different sizes and different shapes of such bearing hubs to be accurately centered with respect to the opening 60. This is accomplished through the provision of a separately formed ring 62 that has its outer annular surface shaped complemental to the groove 60R, and the inside surface of the locating ring 62 has its surface 62B formed to accurately engage the outer surface of the hub 26H of a drill in such a way that the output shaft of the drill will be coaxial with the outer annular surfaces of the ring. In Figs. 2, 3 and 6 the ring 62 is shown with a circular inner surface 62B for receiving a hub 26H of circular form, but this inner surface may take different forms, as shown for example in Fig. 5, where the internal surface 62B is rectangular shape to receive and position a rectangularly shaped hub 26H. Moreover, in Fig. 5, the rectangular surface 62B is shown as modified by circular surfaces 162 so that a single ring 62 may serve to locate either of two different forms of bearing hub. Hence, when the ring 62 supports such a hub in the rabbeted groove 60R, the forward end of the drill is accurately centered upon the axis of the opening 60 so that the output shaft of the drill may constitute the headstock spindle.

At the other or rear end of the drill, the requisite centering is afforded by clamping means that are arranged to clampingly engage and accurately locate the rear end of the drill through cooperation with locating surfaces on the rear end of a drill. As herein shown, such locating surfaces are afforded a projecting headed screw or stud 65 that may be mounted in a threaded opening that normally is provided in such drills in accurate alignment with the axis of the output shaft of such a drill. This added stud 65 has a tapered center hole formed therein, and the clamping means are arranged to engage this center hole, as will be described hereinafter.

To accommodate the handle portions of the drill, the end casting 21R is cut out as at 66, and this cut out portion is arranged to have a rearwardly extending, upwardly facing lower surface 67 that affords a shoulder against which one side surface of the handle 26H of the drill may engage, as shown in Fig. 6 of the drawings, thus to afford an eccentrically located reaction point for the rotative forces that are applied in a counter-clockwise direction, Fig. 6, when the tool is operated. It will be evident that in this location the controlling trigger 26T of such drill will be readily accessible, and that the trigger lock 26L will also be readily accessible to the user, as shown in Figs. 1 and 6 of the drawings.

The clamping and locating means for the rear end of the drill are afforded by a relatively small clamping bar 70 that is mounted on the projecting end of a stationarily located clamping bolt 71. The headed inner end of the clamping bolt 71 is located between and held against rotation by ribs 72 formed internally on the wall of the bracket 21R, and this bolt extends through the center point of the clamping bar 70 and has a knurled clamping nut 73 threaded thereon. At its upper end the bar 70 is provided with centering means adapted for engagement with the locating surfaces on the drill, and where a stud 65 or the like affords such locating surfaces, the opposite ends of the clamping bar 70 have extending centering pins 70S and 70L formed respectively thereon and these centering pins are of different lengths and have conical ends for purposes that will appear hereinafter. One of the centering pins is adapted to be engaged with a center hole 74 that is formed in the outer face of the end casting 21R in the plane of the bars 25, and it should also be observed that the clamping bolt 71 is also in this plane. Hence, when the lower one of the centering pins is located in the center hole 74, the upper one of these pins will be located in this same plane, and the length of the clamping bar 70 and the spacing of the centering pins are such that under the circumstances described, the upper one of the centering pins will also be located on the axis that is desired for the headstock spindle. When the clamping nut 73 is tightened, the endwise forces applied to the drill 26 are transmitted to the locating ring 62 and to the rearwardly facing surface of the annular rabbeted groove 60G.

The provision of two different lengths for the centering pins 70S and 70R enables different lengths of drills to be readily and easily mounted in the headstock, and it should be observed that the clamping bar 70 is relatively small so that it will extend into the hand opening of a saw-drill where such drill is to be mounted in the headstock. While the use of different lengths of centering pins on the clamping bar 70 enables a limited variation or difference in the length of the drills that may be mounted in the headstock, it should be observed that the spacing bracket 30 and the cover plate 51 are the only elements that require change where other lengths of drills need to be mounted in the headstock. This simplifies manufacturing and inventory problems.

It will be evident that the headstock of the present invention may be readily associated with spacing rods such as the rods 25 to connect the headstock with a tailstock in the manner described in detail in my aforesaid copending application Serial No. 391,336, and it should also be observed that by reason of the mounting flanges and mounting notches 32, the present headstock may be supported or mounted independently of the spacing rods 25. This enables the present headstock to be mounted in widely spaced but aligned relationship with respect to a tailstock, or to be mounted independently of a tailstock for use in sanding, buffing, grinding and like operations.

From the foregoing description, it will be apparent that the present invention enables headstock structures to be provided in a simple and economical way to accommodate portable electric drills of different sizes and designs. More specifically, it will be evident that the present invention adapts head stock structures to receive different sizes and designs of drills without structural change in the headstock, thereby to simplify the manufacture and marketing of such headstocks.

Thus, while I have illustrated and described the preferred embodiment of my invention, it is to be understood that this is capable of variation and modification, and I therefore do not wish to be limited to the precise details set forth, but desire to avail myself of such changes and alterations as fall within the purview of the following claims.

I claim:

1. In a headstock, a mounting structure having front and rear upstanding end plates each having a bottom mounting surface and means rigidly connecting said respective end plates, means on said mounting structure for fixedly securing the mounting structure to longitudinal tie rods, means on said front end plate for receiving and centering the bearing hub of a portable electric drill, means on said rear end plate for receiving and clamping the rear end of such a drill, and means on said rear end plate affording a reaction surface against which the handle of such a drill may bear to hold the drill against rotation.

2. In a headstock, a mounting structure having front and rear upstanding end plates each having a bottom mounting surface and means rigidly connecting said respective end plates, means on said mounting structure for fixedly securing the mounting structure to tie rods, replaceable means on said front end plate for receiving and centering the bearing hub of a portable electric drill, means on said rear end plate for receiving and clamping the rear end of such a drill, and means on said mounting structure affording a reaction surface against which an eccentric portion of such a drill may bear to hold the drill against rotation.

3. In a headstock, a mounting structure having front and rear upstanding end plates each having a bottom mounting surface and means rigidly connecting said respective end plates, means on said mounting structure for fixedly securing the mounting structure to tie rods, means on said front end plate for receiving and centering the bearing hub of a portable electric drill, a clamping bar on said rear end plate for engagement with the rear end of such a drill to apply clamping forces thereto, and means on said mounting structure affording a reaction surface against which an eccentric portion of such a drill may bear to hold the drill against rotation.

4. In a headstock, a body structure comprising front and rear upstanding end plates each having a bottom mounting surface, and means rigidly connecting said end plates, means on said body structure for fixedly securing the body structure to tie rods, said front end plate having annular positioning means including a circular opening formed therein concentric with the desired headstock spindle axis, a separately formed removable locating ring having an outer annular surface complemental to said positioning means and having an opening therethrough that is complemental to the external shape of the bearing hub of a portable electric drill for receiving and centering such a hub in said circular opening, means on said rear end plate for receiving and clamping the rear end of such a drill, and means on said rear end plate affording a reaction surface against which an eccentric part of such a drill may bear to hold the drill against rotation.

5. In a headstock, front and rear upstanding end plates each having a bottom mounting surface, a separately formed connecting bracket having end webs disposed against inner surfaces of the respective end plates, means fixing said end webs to said end plates, means on said bracket for fixedly securing the bracket to longitudinal tie rods, said front end plate having annular positioning means including a circular opening formed therein concentric with the desired headstock spindle axis and having a concentric rabbeted groove about said opening in the inner surface of said front end plate, a locating ring having an outer annular surface complemental to said positioning means and having an opening therethrough that is complemental to the external shape of the bearing hub of a portable electric drill for receiving and centering such a hub in said circular opening, means on said rear end plate for engaging and applying endwise clamping forces to the rear end of such a drill, and means on said rear end plate affording a reaction surface against which the handle of such a drill may bear to hold the drill against rotation.

6. In a headstock, front and rear upstanding end plates each having a bottom mounting surface, a separately formed connecting bracket having end webs disposed against inner surfaces of the respective end plates, means fixing said end webs to said end plates, means on said bracket for fixedly securing the bracket to tie rods, said front end plate having annular positioning means including a circular opening formed therein concentric with the desired headstock spindle axis, a locating ring having an outer annular surface complemental to said positioning means and having an opening therethrough that is complemental to the external shape of the bearing hub of a portable electric drill for receiving and centering such a hub in said circular opening, a clamping bar having centering pins projecting laterally from opposite ends of said bar and said pins being of different lengths, a clamping stud projecting endwise from said rear plate, said bar being disposed on said stud, a clamping nut on said stud, a center hole formed in the outer surface of said rear plate beneath said stud to receive one of said pins while the other of said pins engages and applies clamping forces to the rear end of such a drill, and means on said rear end plate affording a reaction surface against which the handle of such a drill may bear to hold the drill against rotation.

7. In a headstock, front and rear upstanding end plates each having a bottom mounting surface, a separately formed connecting bracket having end webs disposed against inner surfaces of the respective end plates, means fixing said end webs to said end plates, means on said bracket for fixedly securing the bracket to tie rods, said front end plate having positioning means thereon operable to receive and position the forward end of a portable electric drill, a clamping bar having centering pins projecting laterally from opposite ends of said bar and said pins being of different lengths, a clamping stud projecting endwise from said rear plate, said bar being disposed on said stud, a clamping nut on said stud, a center hole formed in the outer surface of said rear plate beneath said stud to receive one of said pins, while the other of said pins engages and applies clamping forces to the rear end of such a drill, and means on said rear end plate affording a reaction surface against which the handle of such a drill may bear to hold the drill against rotation.

8. In a headstock, front and rear upstanding end plates each having a bottom mounting surface, a separately formed connecting bracket having end webs disposed against inner surfaces of the respective end plates, means on said bracket for fixedly securing the bracket to tie rods, means for fixing said end plates to said bracket with said locating surfaces in predetermined relation with respect to said mounting surfaces, said front end plate having annular positioning means including a circular opening formed therein concentric with the desired headstock spindle axis, a locating ring having an outer anular surface complemental to said positioning means and having an opening therethrough that is complemental to the external shape of the bearing hub of a portable electric drill for receiving and centering such a hub in said circular opening, a clamping bar having centering pins projecting laterally from opposite ends of said bar and said pins being of different lengths, a clamping stud projecting endwise from said rear plate, said bar being disposed on said stud, a clamping nut on said stud, a center hole formed in the outer surface of said rear plate beneath said stud to receive one of said pins, while the other of said pins engages and applies clamping forces to the rear end of such a drill, and means on said rear end plate affording a reaction surface against which a part of such a drill may bear to hold the drill against rotation.

9. In a headstock, front and rear upstanding end plates each having a bottom mounting surface, a separately formed connecting bracket having end webs disposed against inner surfaces of the respective end plates, means fixing said end webs to said end plates, means on said bracket for fixedly securing the bracket to tie rods, said front end plate having positioning means thereon to receive and position the bearing hub of a portable electric drill, means on said rear end plate for engaging and applying endwise clamping forces to the rear end of such a drill, said end plates having rabbeted grooves formed along their adjacent forward and upper edges, and a thin sheet metal cover plate disposed with its opposite edges in said grooves and fixed therein to close the forward side of said headstock, and means on said rear end plate affording a reaction surface against which an eccentric portion of such a drill may bear to hold the drill against rotation.

10. In a headstock, front and rear upstanding end plates each having a bottom mounting surface, a separately formed connecting bracket rigidly connecting the respective end plates, means on said end plates to receive and position the bearing hub of a portable electric drill, means on said end plates for engaging and securing such a drill in position, said end plates having projection flanges defining rabbeted grooves along their adjacent forward and upper edges, and a thin sheet metal cover plate disposed with its opposite edges in said grooves and against said flanges to close the forward side of said headstock, the other edges of said cover plate being bent inwardly around the ends of said flanges to hold said cover plate in position, and means on said rear end plate affording a reaction surface against which an eccentric portion of such a drill may bear to hold the drill against rotation.

11. In a headstock, rigidly connected front and rear upstanding end plates, centering means on said front end plate to receive and position the bearing hub of a portable electric drill, means on said rear end plate for engaging and clamping such a drill in position for engagement with said centering means, said end plates having projecting flanges defining rabbeted grooves along their adjacent forward and upper edges, and a thin sheet metal cover plate disposed with its opposite edges in said grooves and against said flanges to close the forward side of said headstock, the other edges of said cover plate being bent inwardly around the ends of said flanges to hold said cover plate in position.

12. In a headstock, rigidly connected front and rear upstanding end plates, said front end plate having positioning means including a positioning opening formed therein in predetermined relation to the desired headstock spindle axis, a locating ring having an outer surface complemental to said positioning means and having an opening therethrough that is complemental to the external shape of the bearing hub of a portable electric drill for receiving and centering such a hub in said positioning opening, a clamping bar having a centering pin projecting laterally from one end thereof and having means at the other end thereof for engaging locating surfaces on the rear end of a drill, a clamping stud projecting endwise from said rear plate, said bar being disposed on said stud, a clamping nut on said stud, and a center hole formed in the outer surface of said rear plate beneath said stud to receive said pins, while said means at said other end of said bar engages and applies clamping forces to the rear end of such a drill.

References Cited in the file of this patent

UNITED STATES PATENTS

| Number | Name | Date |
|---|---|---|
| 536,048 | Schofield | Mar. 19, 1895 |
| 1,794,149 | Collins | Feb. 24, 1931 |
| 2,200,799 | Miller | May 14, 1940 |
| 2,373,785 | Seaboly | Apr. 17, 1945 |
| 2,492,783 | Chamberlain | Dec. 27, 1949 |
| 2,649,868 | Gommel | Aug. 25, 1953 |

OTHER REFERENCES

Montgomery Ward Fall and Winter Catalog for 1949–1950, page 1076. (Copy in Div. 29.)